United States Patent [19]
Pekelney et al.

[11] Patent Number: 6,137,472
[45] Date of Patent: *Oct. 24, 2000

[54] METHOD AND APPARATUS FOR CURSOR POSITIONING

[75] Inventors: Richard Pekelney, North White Plains, N.Y.; Ken Medellin, Bethlehem; Steven A Bennett, Harleysville, both of Pa.

[73] Assignee: ACCO USA, Inc., Lincolnshire, Ill.

[*] Notice: This patent is subject to a terminal disclaimer.

[21] Appl. No.: 08/837,643

[22] Filed: Apr. 21, 1997

Related U.S. Application Data

[63] Continuation of application No. 08/327,137, Oct. 21, 1994, Pat. No. 5,642,131.

[51] Int. Cl.⁷ .................................................. G09G 5/08
[52] U.S. Cl. .................................................. 345/145
[58] Field of Search .................................. 345/145, 146, 345/156, 157, 160

[56] References Cited

U.S. PATENT DOCUMENTS

| | | |
|---|---|---|
| 4,698,625 | 10/1987 | McCaskill et al. . |
| 4,731,609 | 3/1988 | Reynolds et al. . |
| 4,782,327 | 11/1988 | Kley et al. . |
| 4,847,605 | 7/1989 | Callahan et al. . |
| 4,935,728 | 6/1990 | Kley . |
| 4,987,411 | 1/1991 | Ishigami . |
| 5,068,802 | 11/1991 | Miyashita et al. . |
| 5,164,713 | 11/1992 | Bain . |

FOREIGN PATENT DOCUMENTS 3-5791  1/1991  Japan .

*Primary Examiner*—Jeffery Brier
*Attorney, Agent, or Firm*—McCutchen, Doyle, Brown & Enersen, LLP

[57] ABSTRACT

A cursor positioning system for use with computer systems employing relative-pointing devices (e.g., trackballs or mice) for cursor positioning functions. The cursor positioning system employs a cursor driver, stored in a memory of the computer system and responsive to cursor positioning signals from the relative-pointing device, to enable fast and accurate cursor positioning to specific, predefined locations. The cursor driver responds to user-actuated signals, such as "clicks" or keystrokes to record cursor position objects at particular cursor locations. Thereafter, during cursor position selection mode, initiated by a keystroke or relative-pointing device signal, the cursor's position is moved from position object to position object. The preferred embodiment also provides for recording of bias objects, typically the same as the position objects, to attract the cursor's location towards them. This attraction reduces undershoot and overshoot of the cursor. Additionally, autoconfiguration of the cursor position/bias objects results from monitoring for prespecified actions from the user, such as "click"-events, and recording that position when the number of clicks at that location exceed a particular threshold. Subsequent use or non-use of that position can increase that objects weighting for bias influence effects. The cursor positioning system provides consistent cursor positioning tools, for all applications, and permits addition of new cursor tools to applications and the operating without modification of the applications.

33 Claims, 6 Drawing Sheets

METHOD AND APPARATUS FOR CURSOR POSITIONING

This is a continuation of application No. 08/327,137 filed Oct. 21, 1994 now U.S. Pat. No. 5,642,131 the disclosure of which is incorporated by reference.

BACKGROUND OF THE INVENTION

The present invention relates generally to relative-pointing devices, and more specifically to apparatus and method for improving a positioning of a cursor controlled by a relative-pointing device.

It is well known in the art to use a relative-pointing device (RPD), such as a trackball or a mouse, with a computer system. An application or an operating system permitting use of the RPD provides a user with one mechanism to control and input information into the computer system by its use. Some applications and operating systems, such as those designed for use with Macintosh® computers from Apple Computer of Cupertino, Calif., or those running under Microsoft Windows, from Microsoft Corporation of Redmond, Wash., use graphical user interfaces (GUIs). A GUI relies heavily on RPD input, allowing the user to perform many functions by use of the RPD. In some instances, there is no substitute for the information provided by the RPD.

Presented at various locations on a monitor of the computer system are various symbols or objects. Associated with these symbols and objects are particular functions or features the application or operating system performs upon their selection. Selection of a particular symbol or object results from positioning the cursor over the symbol or object and signalling the computer system. Signalling typically results from activation of a switch of the RPD.

In operation, the application or the operating system will present a cursor on a monitor of the computer system. Manipulation of the RPD issues cursor positioning signals to the computer system. The RPD, being a relative device, provides cursor positioning signals as deltas for X and Y. That is, the data provided by the RPD includes a delta X value representing a change in an X position of the RPD, and a delta Y value representing a change in a Y position of the RPD. A special routine of the GUI, known as a cursor driver, receives these signals and translates them into signals the computer system uses to present the cursor at a new location. Movement of the cursor presented on the monitor corresponds to the delta X and delta Y signals. Typically, communications hardware (e.g., a serial I/O port) in the computer is connected to the RPD. When the RPD sends data to the communications hardware, the communications hardware interrupts any program the computer system's central processing unit is executing and passes control to the cursor driver. The cursor driver processes the data and returns control to the interrupted program. This interrupt driven system is typical of IBM-PC compatible systems. For Macintosh-type computer systems, servicing of RPD data is periodic. Either method is possible in a given implementation.

The cursor driver for the cursor positioning signals operates by periodically interrupting the computer system to check whether the RPD indicates a new position, and if so, the magnitude of any change. Cursor drivers rarely perform processing of the positioning signals beyond simple translation of the positioning signals to computer data so as to not degrade computer performance. One example of enhanced processing of the cursor positioning signals includes multiplying the delta X and delta Y values by a particular value when the deltas exceed one or more predetermined thresholds, with a threshold measured in units per cycle period. This enhancement to cursor positioning processes permits direct control for slow movements of the RPD, and magnified positioning for fast movements of the RPD.

The magnification of cursor positioning signals for fast cursor movement is important for those applications and operating systems that extensively use the RPD. The magnification feature permits rapid movement of the cursor from one position on the monitor to another remote position. Efficiency in using the RPD with the computer system results directly from being able to rapidly and accurately position the cursor to desired locations on the monitor.

Cursor drivers for the RPD, not being an integral part of the operating system, coexist with the operating system processes and other applications processed by the computer system. This coexistence requires that processing by the cursor driver not adversely impact performance or memory requirements of the computer system. Providing fast processing of the cursor positioning signals through use of minimal code is an important consideration for these cursor drivers. Extensive processing of the cursor positioning signals is not possible if the cursor driver is to meet its goal of minimal impact on computer system performance.

One disadvantage with prior art RPD and cursor driver systems is that accurate cursor positioning, directly to a particular desired location, is inefficient. The user is able to position the cursor close to the desired location, but overshoot or undershoot prevent the user from precise positioning of the cursor. Maneuvering the cursor directly to the desired location must be done with care, requiring slower action. This slows productivity when the computer system requires the user to concentrate on accurate placement of the cursor. It would be better if the cursor could be properly positioned without effort from the user.

Another disadvantage of prior art RPD and cursor driver systems used for cursor control is that the cursor position is required to change from position to position, anywhere on the monitor. As monitors become larger, positioning the cursor over wide areas requires more time and effort. Some computer systems employ multiple monitors. Cursor positioning signals from the RPD move the cursor between the monitors, just as though the monitors were extensions of each other. That is, for dual monitors set up for side-by-side operation, when the cursor begins at the left edge of the left-most one of the dual monitors, the user must position the cursor, via cursor positioning signals, completely across the first monitor and then on to the second monitor. It can be time-consuming to move the cursor between the different monitors.

Many prior art applications which use the RPD have specialized and unique activation procedures for implementing common functions. For example, many drawing applications allow a user to constrain cursor movement to a particular direction even though the cursor positioning signals indicate a different direction. That is, a user is able to constrain cursor motion in an X-only direction, even though the RPD may include a Y-component in the cursor positioning signal.

It is inconvenient to the user when different applications implement these procedures in different ways, or when the procedures are not available to all applications using the operating system. Additionally, there are some desirable procedures not available in some applications that are available in others. An improvement in user efficiency and productivity result from consistent interfaces and feature sets.

SUMMARY OF THE INVENTION

The present invention provides method and apparatus which assist a user in efficiently positioning a cursor presented on a monitor. One preferred embodiment of a cursor positioning system according to the present invention improves efficiency in use of cursor-intensive computer systems. By using the system, a user is able to quickly move a cursor to precise locations, without overshooting or undershooting the desired location. Other embodiments of the present invention provide for consistent cursor positioning features for all applications and to the operating system. One embodiment includes an enhanced feature set for cursor positioning.

According to one aspect of the invention, the cursor positioning system includes a computer system having a memory, a monitor and a processor, a relative-pointing device (RPD) coupled to the computer system, and a mechanism for recording one or more cursor positions, or position objects, to the memory. Recording is performed by reading predefined positions into memory, or dynamically recording positions according to user-initiated signals. Upon detection of an activation of a position-selection mode, the cursor's position is changed to one of the recorded cursor positions. User-controlled signals to the computer system, for example from the RPD or from the keyboard, while in the position-selection mode will change the cursor's displayed position among the other recorded cursor positions. The user is able to dynamically configure the recorded cursor positions, customizing cursor positions to enhance the individual's style of use of the RPD.

In another embodiment, a biasing mode reduces overshoot and undershoot during cursor positioning. In the biasing mode, the recorded cursor position objects act as though they were attracting the cursor towards them.

That is, the cursor's position is altered by a proximity to a recorded cursor position, changing the cursor's position from the position identified by the cursor positioning signals. Single- or multi-parametric functions control how the bias effect is implemented. Different embodiments will implement different biasing functions, depending upon particular requirements.

The present invention provides for an enhanced feature set, consistent across applications. For example, one feature provides an ability to constrain cursor movement in horizontal or vertical directions through the RPD cursor driver. Another feature provides a "Slow Cursor Mode". Slow Cursor Mode moves a cursor's position at a rate slower than a rate determined by the cursor positioning signals. The Slow Cursor Mode assists in accurate cursor positioning by reducing the cursor's sensitivity to the cursor positioning signals, as opposed to magnification of the signals which decrease sensitivity. Implementing features at the cursor driver level provides for a feature set, which is a consistent feature set, for all applications in the operating system environment.

The features of the present invention are optionally available to all applications and to the operating system environment, or to particular identified applications. For example, different applications may have different sets of recorded cursor positions, and implement different feature sets. The feature sets are also optionally customized for particular applications.

The present invention offers advantages over the prior art. A user can dynamically configure key cursor positions and record these positions to memory. Activating a position-selection mode allows the user to quickly move between the various recorded positions, by RPD movement or keystroke, for example. In another embodiment, the recorded positions bias the cursor towards them, permitting precise positioning without express activation of a position-selection mode.

For GUI-type operating systems or shells, applications executing on the processor are prevented from direct interaction with the hardware, but must go through the operating system. The cursor driver, however, is able to directly, and is designed to, interact with the hardware of the computer. Thus, by providing the features of the cursor positioning system in the cursor driver, the features are available to all applications, at virtually all times.

Reference to the remaining portions of the specification and drawings may realize other features and advantages of the present invention.

DESCRIPTION OF THE PREFERRED EMBODIMENT

Figure 1:
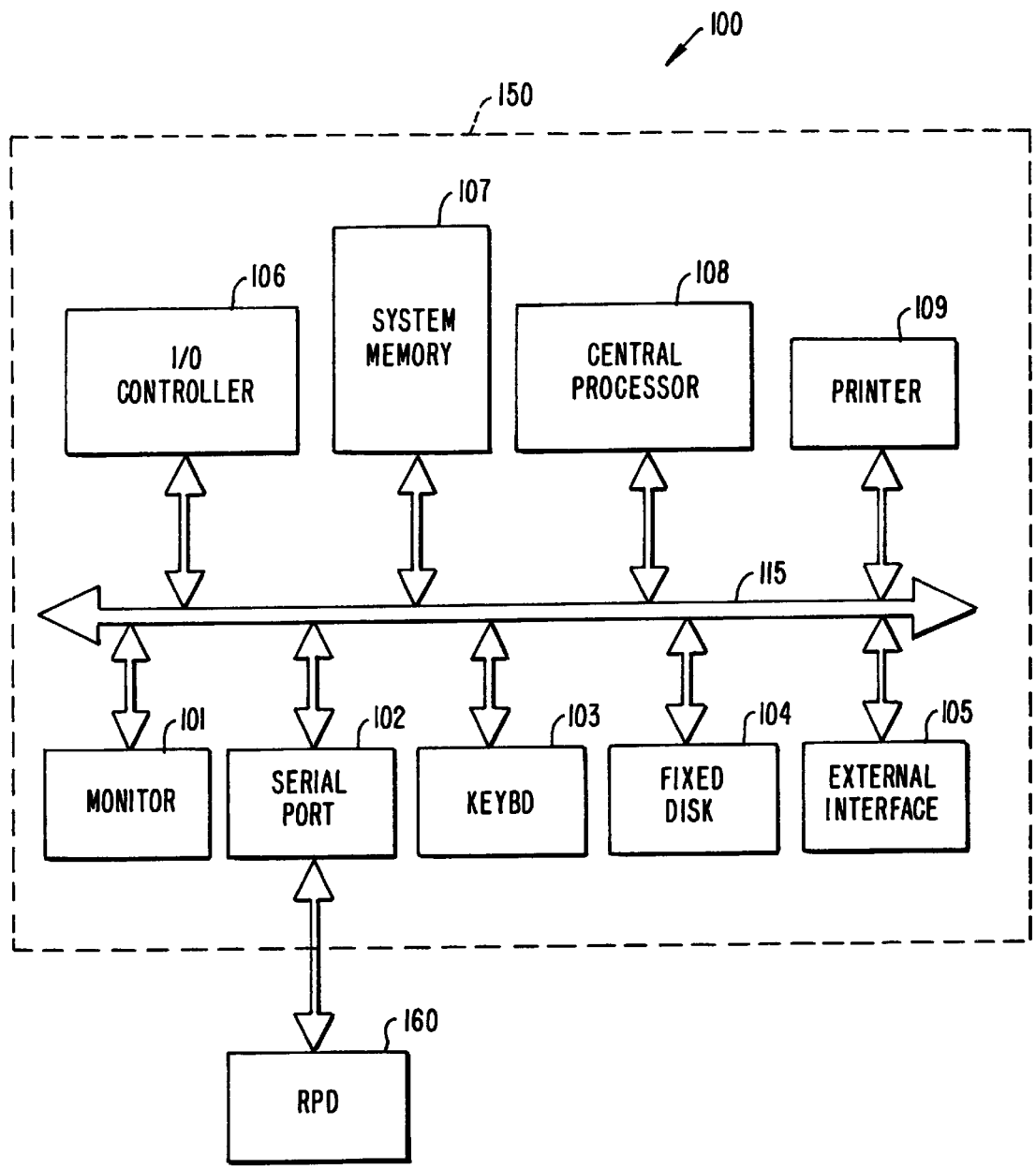
FIG. 1 is a cursor positioning system 100 according to a preferred embodiment of the present invention.
Figure 4:
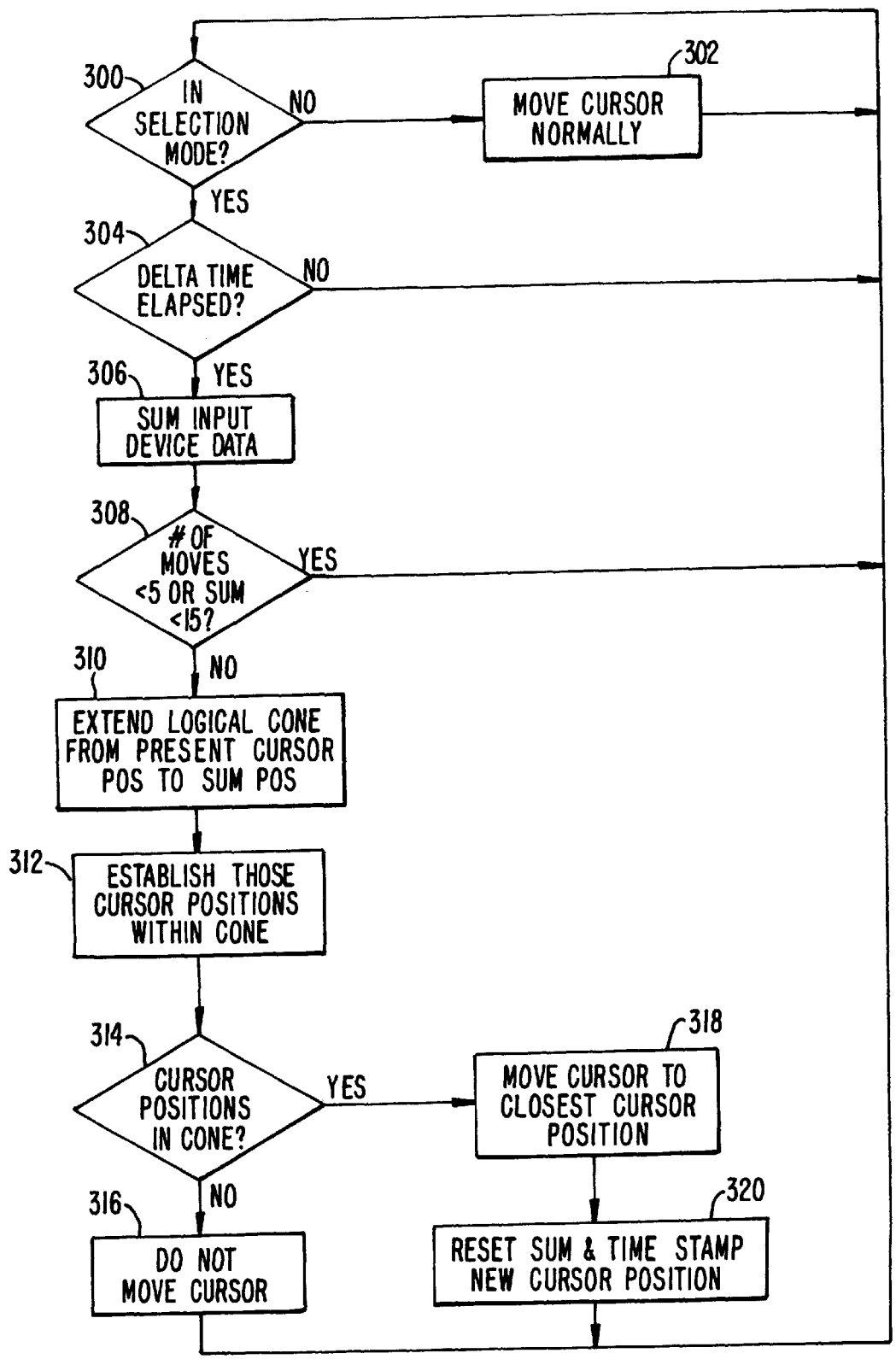
FIG. 4 is a flowchart of operation of the cursor positioning system 100 according to a preferred embodiment.
Figure 5:
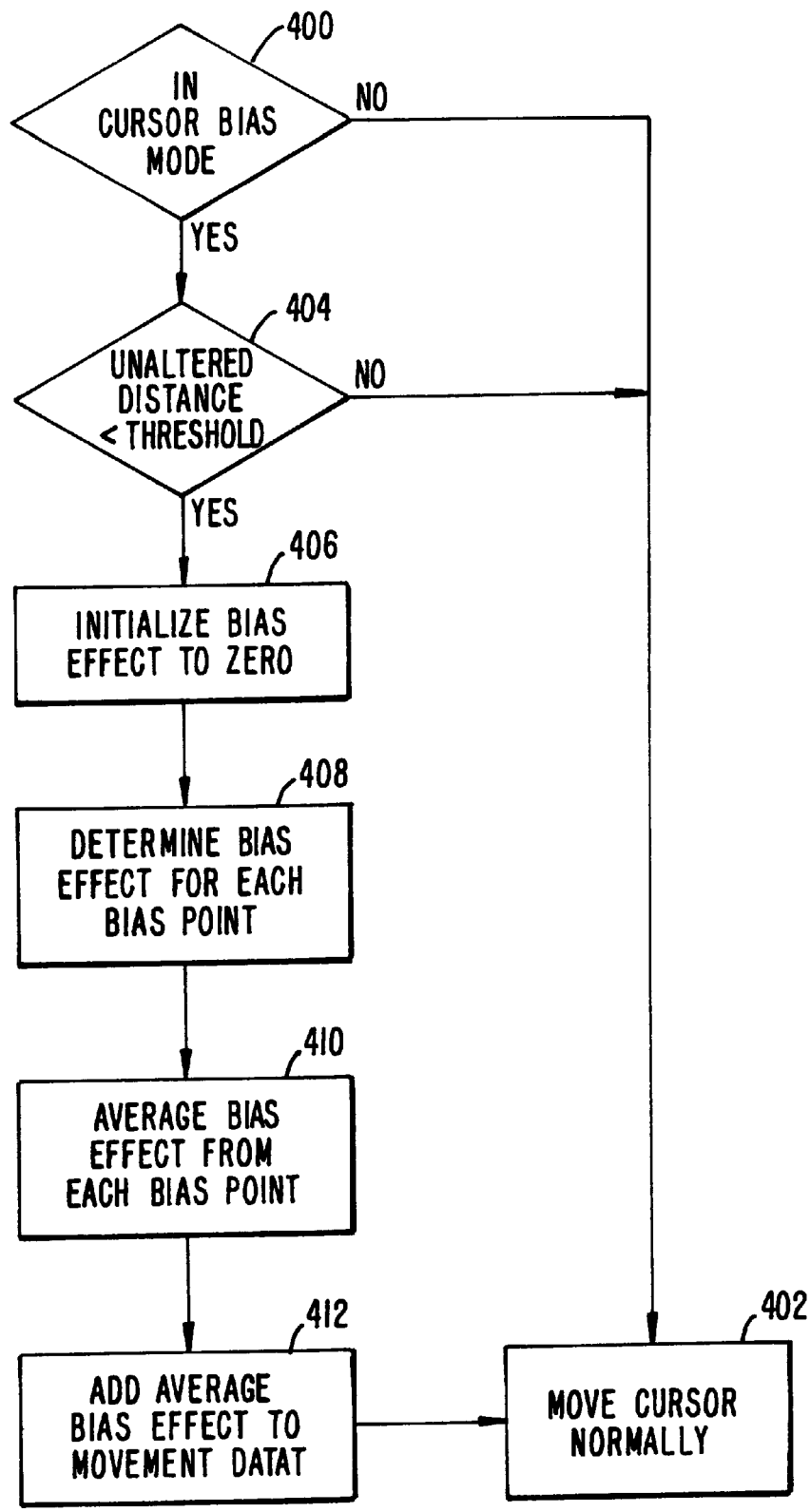
FIG. 5 is a flowchart of operation of the cursor positioning system 100 in biasing mode.
Figure 6:
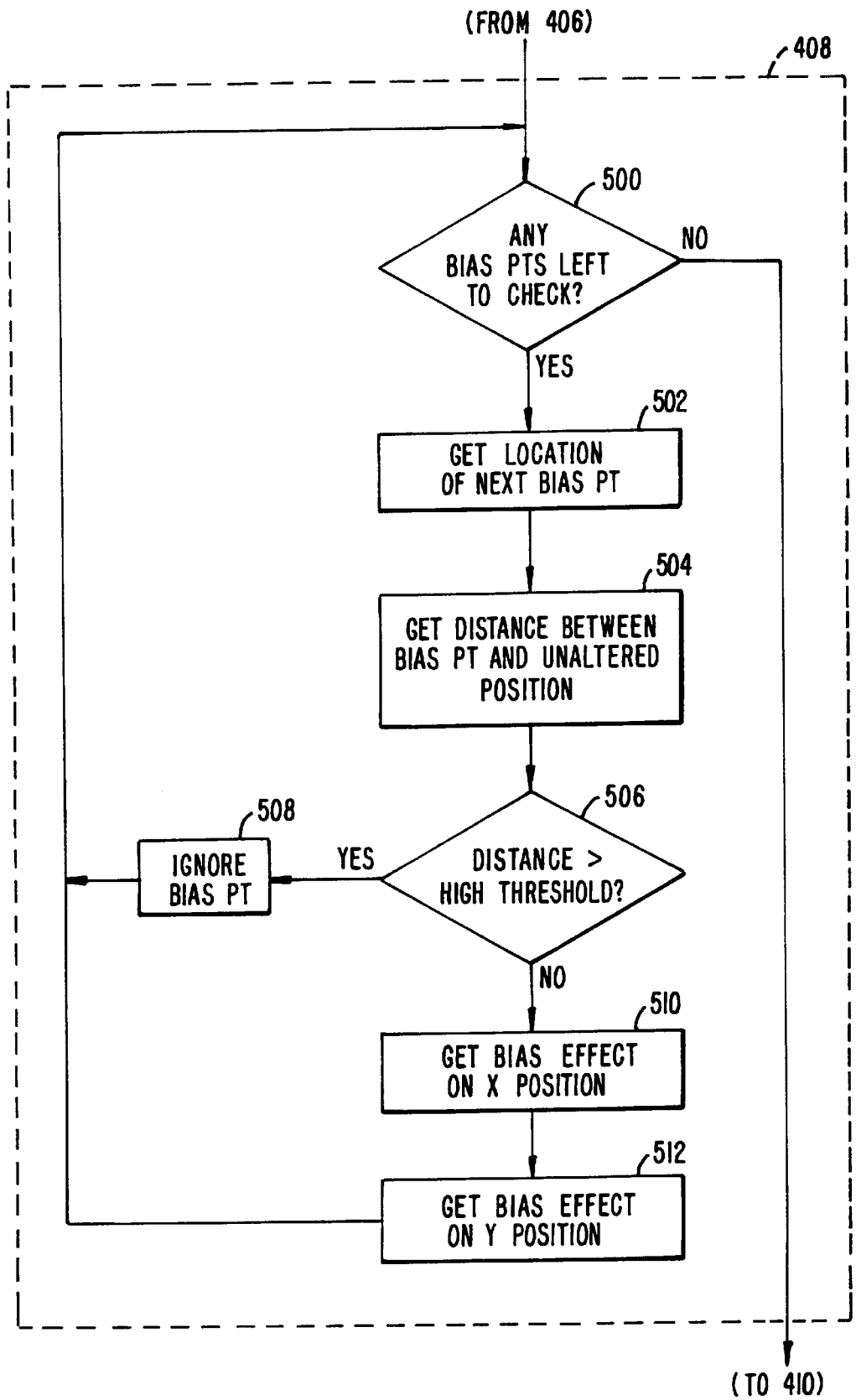
FIG. 6 is a detailed flowchart for the bias effect determination step 408 of FIG. 5.

FIG. 1 is a cursor positioning system 100 embodying a preferred embodiment of the present invention. The cursor positioning system 100 includes a computer system 150 coupled to a RPD 160. The computer system 150 includes a central processor 108, a system memory 107, an input device such as a keyboard 103, for example, a fixed disk 104, a monitor 101, an external interface 105, a printer 109, an input/output (I/O) controller 106, and a communications port 102. A system bus 115 couples all the components of the computer system 150, providing a link between them. A preferred embodiment uses an appropriately programmed Apple Macintosh® computer (Apple Computer, Cupertino, Calif.). It is to be understood that other platforms are available and may embody the invention in other forms. The invention is not limited to embodiments that include Apple computers. The flowcharts of FIGS. 4, 5 and 6 are implemented by the central processor 108 under appropriate process control and instruction from procedures stored in the system memory 107 and provided as part of the cursor driver.

The communications port 102 may be implemented in different ways. The Macintosh uses an "Apple Desktop Bus" (ADB) port, the IBM PS/2's employ a "Pointing Device Port" (PDP), and other machines typically employ a serial communications port as the communications port 102.

Figure 2:
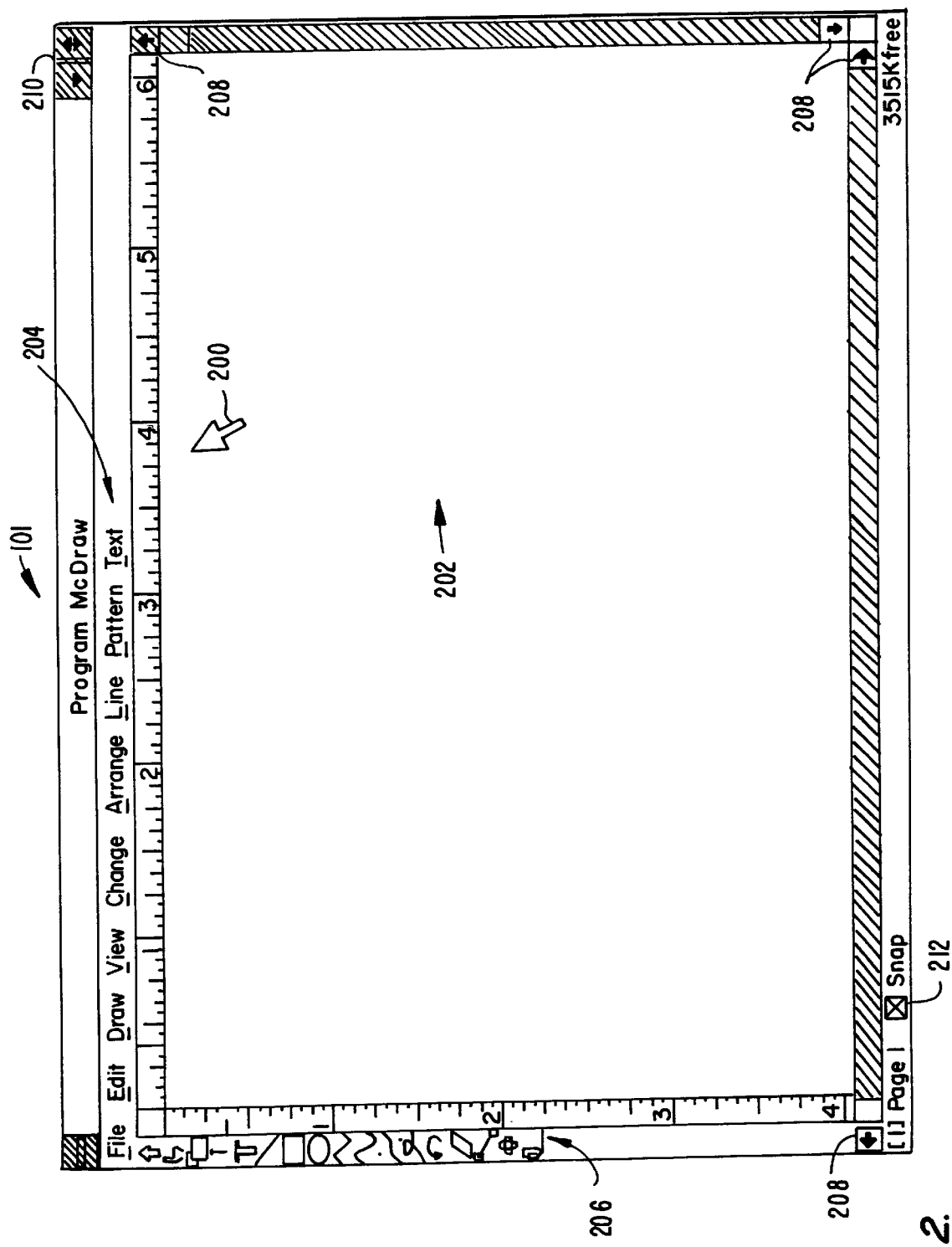
FIG. 2 is a view of a presentation on the monitor 101 of the cursor positioning system 100.

FIG. 2 is a view of a presentation on the monitor 101 of the cursor positioning system 100. The monitor 101 presentation includes a cursor 200 positioned in a client area 202 of an application identified as PROGRAM. PROGRAM includes a number of controls and tools selectable by the cursor 200. These controls and tools include a menubar 204, a palette 206, scroll buttons 208, window sizing buttons 210, and a checkbox 212, for example. These items are well known in the art.

The menubar 204 includes several items, each having an associated menu, from which functions and features of PROGRAM are initiated. The palette 206 includes an assortment of tools used in the application. Each program typically has its own assortment of tools, the set of which may be customizable. The scroll buttons 208 control a view area of the client area 202 in horizontal and vertical directions. The window sizing buttons control whether the application is iconized, full screen or overlapped. The checkbox 212, an example of a control feature, alternately selects and deselects an identified feature. In the present case, the checkbox controls a snap feature.

Positioning of the controls and tools typically varies by application. To select a particular control or tool, the cursor 200 is positioned overlying the desired control or tool object presented on the monitor 101. The user issues a signal to the computer system 150, typically by operation of a switch on the RPD 160, when the cursor is properly positioned. The switch operation causes the computer system 150 to take an appropriate action represented by the object underneath the cursor.

Figure 3:
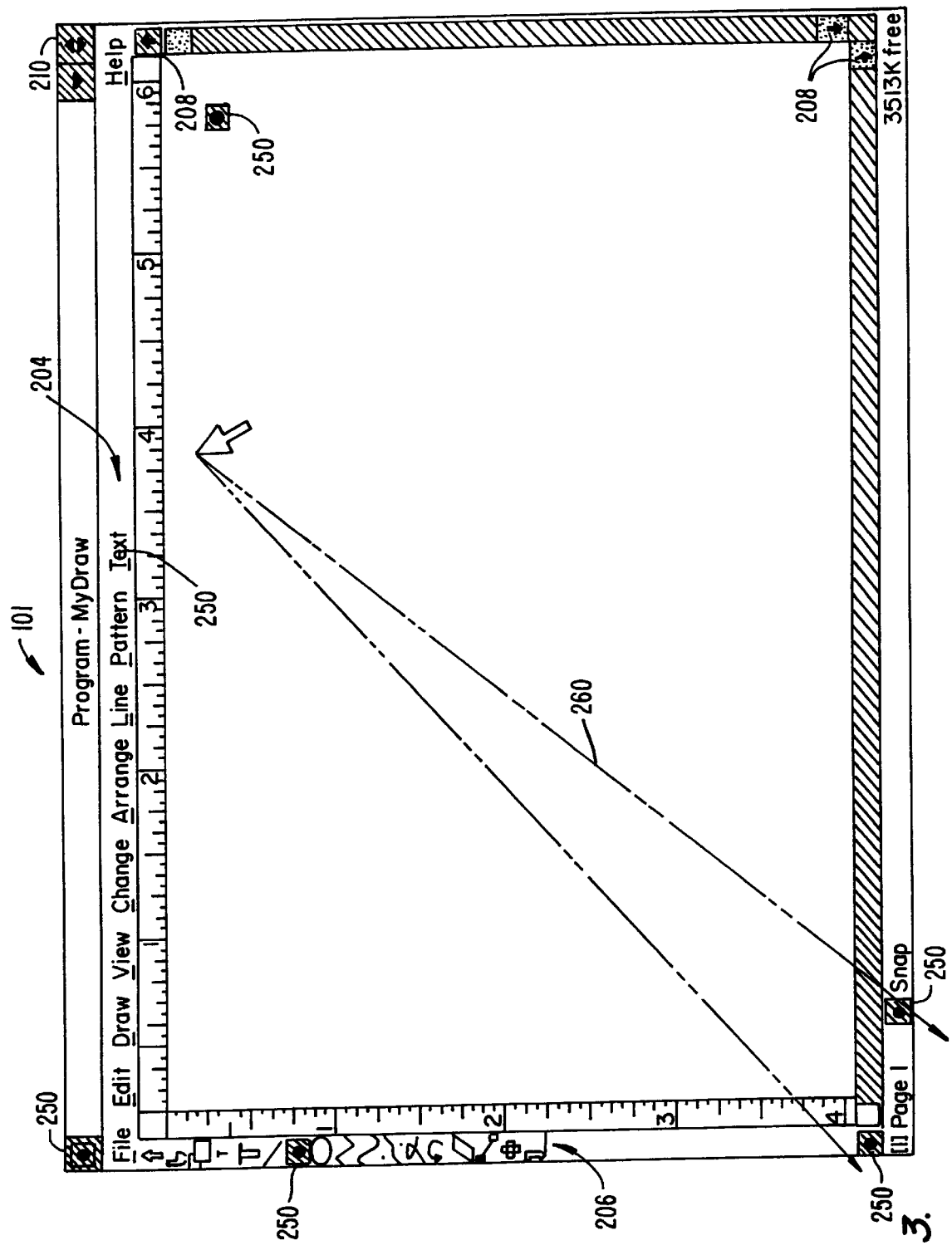
FIG. 3 is a view of a presentation on the monitor 101 of the cursor positioning system 100 in a position-definition mode.

FIG. 3 is a view of a presentation on the monitor 101 of the cursor positioning system 100 in a position-definition mode. In the position-definition mode, select cursor positions are identified by a cursor position object 250.

These cursor position objects 250 are defined by the application, or by the user.

To define cursor position objects 250, the user enters the position-definition mode. In this mode, a definition application allows a user to add or delete cursor position objects 250. These cursor position objects 250, displayed in the definition mode, are superimposed over a display of the application or the operating system environment which was active at the time the user initiated the position-definition mode.

Cursor position objects 250 are created, in the preferred embodiment, by positioning the cursor 200 at a particular location and signalling the computer system 150. The signalling results from operation of the RPD 160 switch, or from a keyboard 103 input. A cursor position object 250 is recorded in response to the signal from the user, unless the cursor 200 overlies a previously recorded cursor position object 250. Signalling when in the position-definition mode and when the cursor 200 overlies a previously recorded cursor position object 250 deletes the underlying cursor position object 250. By moving the cursor 200 over the monitor 101, and recording and deleting cursor position objects 250, the user develops a set of cursor position objects 250. In the preferred embodiment, exiting the definition mode hides the recorded cursor position objects 250.

Thereafter, the user operates the application or computer system 150 normally until the user desires use of the cursor positioning features of the cursor positioning system 100. In the cursor positioning system 100, the user initiates a position-selection mode. Initiation of the position-selection mode allows the user to change directly the cursor's location to one of the recorded cursor position objects 250.

Various selection techniques are available to determine to which one of a plurality of the recorded cursor position objects 250 the cursor 200 is to move. For example, in one embodiment, the initiation of the position-selection mode positions the cursor 200 automatically at a closest cursor position object 250. Thereafter, responsive to a user-initiated action, the location of the cursor 200 moves to another of the cursor position objects 250 in some order. If a control or tool object underlies, or is proximate to, a cursor position object 250, positioning the cursor 200 at the cursor position object 250 allows fast selection of the particular control or tool object.

Cursor positioning signals from the RPD 160 can be used to select a particular one cursor position object 250. Upon initiation of the position-selection mode, the cursor positioning system 100 monitors the cursor position signals. After a threshold check to determine that a user intended to move the position of the cursor 200, the cursor positioning system 100 establishes an area in the direction indicated by the cursor positioning signals of the RPD 160. The cursor's position is changed to a closest cursor position object 250 in the area identified by the cursor positioning signals.

The positioning signals from the RPD 160 are used to define an orientation of a logical cone 260. The cone 260 extends in the direction determined by the cursor positioning signals and measures about nine degrees. The cursor positioning system 100 determines if any cursor position objects 250 are within the cone 260, and then determines which is closest. The location of the cursor 200 is changed to that cursor position object 250 closest to the present location and located within the cone 260. The particular angle selected for the cone 260 will depend on particular design choices, for example such as optimizing performance for monitor size or CPU-type. The nine degree angle chosen allows for fast calculations and performs well for typical ranges of monitor sizes. Wider cones require more calculations with an associated decrease in time available to the CPU to perform other tasks.

In one preferred embodiment, the cursor positioning system 100 provides for creation of temporary cursor position objects. Temporary cursor position objects are not changed in the position-definition mode by the user. Rather, the system 100 employs temporary cursor position objects as a type of cursor 200 placeholder. When a user employs a feature of the cursor positioning system 100 to change the location of the cursor 200, the system 100 records where the cursor 200 was located prior to initiation of the position-selection mode. The system 100 records the position by use of the temporary position object.

These temporary position objects permit a user to position a cursor at a cursor position object 250 defined near a control object, for example, a particular palette tool 206. The user is able to thereafter leave the position-selection mode and use the control object. The user is able to subsequently reenter the position-selection mode and position the cursor at the cursor location the cursor occupied prior to its positioning to the cursor position object near the control object.

FIG. 4 is a flowchart of operation of the cursor positioning system 100 according to the preferred embodiment. The cursor positioning system 100 first determines if it is in the position-selection mode at step 300. If not, the cursor 200 moves normally (step 302). The cursor positioning system 100 returns thereafter to step 300 in response to cursor positioning signals from the RPD 160.

If the system 100 is in the position-selection mode at step 300, the system 100 advances to step 304 to determine if a predetermined amount of time has elapsed since a previous change in the position of the cursor 200. This time period is short, but of sufficient duration to allow the cursor 200 to stop at one cursor position object 250 prior to advancing to another cursor position object 250 further away and within the cone 260. This delay is preferably on the order of 250 milliseconds. If sufficient time has not elapsed, the system 100 returns to step 300 from step 304. System latencies in computer systems would make it difficult for the positioning system to know to stop at the desired cursor position object 250, absent the delay of step 304.

If enough time has elapsed since the last change of position of the cursor 200, the system 100 determines at step 306 a sum of respective X and Y components of the cursor positioning signals from the RPD 160. At step 308, a threshold check, the system 100 determines if the a number of moves is less than five and if the sum of the movements is less than fifteen. If both conditions are met, the system 100 judges that there has been no input signal to move the location of the cursor 200. This determination is a desirable test because input transients are produced from a RPD 160 prior to definitive cursor positioning signal information. These transients result from contacting the RPD 160 and are not intended as positioning signals by the user and should be ignored for this application. Cursor positioning information that does not pass the threshold qualification at step 308 results in a return to step 300.

Cursor positioning signals satisfying the threshold test of step 308 advance the cursor positioning process to step 310. At step 310, the system 100 extends a logical cone from the present cursor position in the direction indicated by the qualified cursor positioning signals. In the preferred embodiment, this logical cone has an angle of nine degrees.

After extending the cone, the system 100 establishes those cursor position objects 250 within the cone at 312. Step 314 determines if there are any cursor position objects 250 within the cone. If not, the system 100 advances to step 316 which inhibits movement of the position of the cursor 200. Thereafter, the system returns to step 300.

If there are cursor position objects 250 within the logical cone 260, the system 100 advances from step 314 to step 318 which moves the position of the cursor 200 to the closest cursor position object 250 within the logical cone. Thereafter, step 320 resets the sum and time stamps the position of the cursor 200 at the cursor position object 250. The system 100 thereafter advances to step 300.

The operation of cursor position object 250 recording and position-selection mode have been described with reference to particular preferred embodiments. Variations of this operation are possible. These variations include presenting an animation sequence for moving the cursor 200 during the position-selection mode to make cursor positioning during position-selection mode easier for a user's eye to follow. This animation would help the user in determining a present location for the cursor 200. The animation sequence presents a cursor image moving from one cursor location to the particular cursor position object 250 selected at a number of intermediate locations, for example.

Another variation presents the cursor position objects to the user during the position-selection mode. Again, this modification would facilitate identification of a present location for the cursor 200. These modifications may be desirable because the position of the cursor 200 changes so quickly in the position-selection mode.

FIG. 5 is a flowchart of operation of the cursor positioning system 100 in the biasing mode. The biasing mode encompasses computer system 150 operations in which biasing objects selectively alter a cursor's location during positioning of the cursor. Bias objects are provided at several locations, similarly to the position objects 250 of FIG. 2. Bias objects optionally include the set of position objects, a subset, or a superset of the set of the position objects. It is possible for the bias objects and the position objects to be separate from each other, although for the preferred embodiment, the positions objects are selectable to also function as bias objects.

A bias object operates to alter a cursor's position from a position location indicated from the cursor positioning signals supplied from the RPD 160 of FIG. 1. In general, the bias effect is an attractive biasing effect, altering the cursor's actual position closer to the biasing object than would have been the case absent the biasing effect. The purpose of this biasing effect is to facilitate accurate cursor positioning to a desired object as effortlessly as possible. That is, when a user defines a biasing object at a desired cursor position, the cursor will be attracted to the bias object. Depending upon particular implementations of the biasing effect, the biasing will overshoot, or undershoot, to a lesser degree than would be true if the positioning system lacked the biasing effect. Implementation of the biasing effect permits less user attention and effort to precisely position a cursor.

When the cursor positioning system 100 receives cursor positioning signals, the system 100 checks to determine if it is in cursor biasing mode, step 400. If not in the cursor biasing mode, or for slow movements of the RPD 160 (with small values of positioning data), the system branches to step 402 to permit unaltered cursor positioning. However, if in the cursor bias mode, the system proceeds to step 404. Step 404 removes bias effects from distant bias objects by determining if an unaltered distance, a distance from a particular bias object to a position of the cursor, is less than a prespecified threshold. For distant bias objects, the system 100 procedure advances to step 402, allowing unaltered cursor positioning.

For those bias objects having an unaltered distance less than the prespecified threshold, the positioning system 100 determines an average net bias effect and alters the cursor's position. First, at step 406, the positioning system 100 initializes a biasing effect accumulator to zero. Step 408 determines a bias effect for each bias point within the threshold of step 404. At step 410, the positioning system averages the bias effect from each of the bias objects contributing to the bias effect. Thereafter, at step 412, the average bias effect from the bias objects is added to the cursor positioning signals to influence the cursor's position as determined solely from the cursor position signals. The system 100 then uses the bias-effect-modified cursor positioning signals to position the cursor, at step 402.

FIG. 6 is a detailed flowchart of the preferred embodiment's implementation of the determination of a bias effect for each bias object, such as illustrated as step 408 of FIG. 5. The positioning system 100, at step 500, determines if there are any bias objects that need to be checked. If there are no bias objects left, then the process flow exits from the determination step 408.

When there are unchecked bias objects, the positioning system 100 obtains a location for the next bias object it is to check, step 502. Next, step 504, the system 100 determines a distance between the bias object and an unaltered position of the cursor. Step 506 tests the distance obtained at step 504 against a high threshold. If the distance exceeds the high threshold, the system 100 flow branches to step 508, which ignores the bias object, and returns to step 500.

If the distance check at step 506 determines that the threshold is not exceeded, the system 100 flow branches to step 510 rather than to step 508. Step 510 determines, for each bias object, the bias object's effect on x movement. Similarly, step 512 determines, for each bias object, the bias object's effect on y movement. After step 512, the system branches back to step 500.

In the preferred embodiment, the cursor positioning system 100 in the cursor bias mode uses equations to determine a component part of each bias object's effect on an unaltered cursor position. A preferred equation is:

$$\text{BIAS EFFECT}_x = \frac{(X_{DISTANCE} \times \text{AGGRESSIVENESS})}{(\text{DISTANCE})}$$

This equation is also applicable to the bias effect for the Y-component of the bias object relative to the unaltered position of the cursor. In the equation, aggressiveness is a factor determining how much influence a particular bias object exerts on a cursor's unaltered position.

Aggressiveness is constant for each of the bias objects of the preferred embodiment of the cursor positioning system. As indicated above, the preferred embodiment uses the set of cursor positioning objects to double as the bias objects as well. Note that selecting an aggressiveness equal to zero effectively deselects cursor bias mode. An aggressiveness of between one (1) and fifteen (15), preferably about seven (7), provides acceptable results on most Macintosh® machines.

The disclosed bias effect equation is a single-parameter equation relating bias effect to distance from a bias object. Other equations, including multi-parametric equations, provide different biasing effects designed to model different performance requirements. For example, a bias effect may be made dependent upon speed or acceleration of a cursor, or it may be made inversely proportional to a square of a distance between the bias object and the unaltered cursor position, for example.

Aggressiveness, or a comparable weighting value, need not be constant for each bias object. Particular bias objects may be more significance than other bias objects, suggesting that they should have a greater weight, or aggressiveness, than other less significant bias objects. Different implementations could allow for users to manually set aggressiveness for each bias object or use an auto-configuring mode which automatically defines and weights cursor positioning objects and bias objects.

Auto-configuring mode includes a set of cursor-significant positions, such as locations at which a user operates, or "clicks" the button of the RPD. If a user clicks at a particular location a minimum number of times exceeding some predetermined threshold, the cursor positioning system 100 will automatically define a cursor position object, or a bias object, or both, at that location. Thereafter, each use of the object would increase its weighting. Each use would increase the weighting a prespecified amount, and preferably would include a maximum weighting. This automatic configuration mode would continuously and dynamically alter the location of cursor objects and their weightings. As the user decreased use of an object, the cursor positioning system could decrease its weighting, and eventually delete the object.

Other mechanisms for auto-configuring position objects or bias objects for the position-selection mode or the biasing mode include use of a list of objects provided by an application or operating system to provide definition to the locations of the objects. Another option is to include the software driver with direction to monitor and analyze data structures of the operating system, or individual applications, to discover the locations of control objects presented on the screen. Once control locations are established, autonomously, by the driver, appropriate objects, such as positioning objects or biasing objects, may be included at the locations of the controls.

It is possible for the biasing function to be tailor-made to individual users. An example would be for the cursor driver to monitor a user's typical pointing errors, and compensate for the particular user's typical errors. That is, a user may typically undershoot a desired location by 1%, for example. The biasing mode would accordingly correct for this typical undershoot when a user moves the cursor. These types of corrections would be available for rapid, or long distance cursor moves. Simple cursor position exercises, or arcade-style procedures, could be used to establish these compensation values. This individual tailoring provides an ability to inference bias based solely upon user behavior, without definition of bias objects by the user or an application. That is, judging relative amount of motion in a given direction compared to an updated direction could produce an indication of overshoot, resulting in application of a compensating bias.

One goal is to provide a dynamic and configurable cursor positioning system whose operation is transparent to the user. The cursor positioning system provides increased efficiency and permits decreased effort for a user in cursor positioning tasks.

Another goal is to provide a consistent set of cursor positioning tools to a user making use of RPDs. These tools include a constrain function. While constraining a cursor to move in only a horizontal, or vertical direction, is common in many applications, especially illustration, drawing, or computer-aided design (CAD) type programs, each application varies in the manner of implementing the function. Providing these types of tools in a cursor positioning system for a cursor driver allows consistency in use of these functions for all applications, even those not providing for the function.

It is still another goal to provide this consistency for tools not found in other applications. When new cursor functionality is desired for one or more applications, providing the cursor tools in the cursor drivers allows a user to customize an application independent of the applications developer. One such tool is a "microscope-type" cursor positioning tool, also referred to as a slow cursor mode, which allows precise cursor positioning. This tool, available in the cursor positioning system, does the inverse of the magnification of cursor positioning signals. The microscope-type tool divides cursor positioning signals to produce less cursor movement from corresponding cursor positioning signals.

In conclusion, the present invention simply and efficiently provides an apparatus and method for an enhanced cursor positioning system operable with relative-pointing devices. The cursor positioning system provides for definition of cursor position objects and cursor bias objects. These cursor objects, once defined, permit a user to quickly position a cursor by use of the relative-pointing device. Precise positioning of the cursor to desired locations of the monitor result from movement of the cursor to a desired one of the defined cursor position objects. A position object selection mode moves quickly among the defined position objects, accurately and efficiently positioning the cursor. The preferred embodiment includes a bias mode, in which bias objects attract a cursor's location, further facilitating cursor positioning.

The above is a complete description of the preferred embodiments. It is possible to use various alternatives, modifications, and equivalents in the practice of the present invention, some of which have been described herein.

However, the above description of the preferred embodiments does not limit the scope of the invention. The appended claims define this scope.

What is claimed is:

1. A cursor-positioning method, comprising the steps of:
   creating a cursor-position object for a cursor displayed on a monitor of a computer system by use of a cursor driver coupled to a memory of said computer system;
   activating a position-selection mode; and
   positioning a cursor proximate to said cursor-position object after activation of said position-selection mode.

2. The cursor-positioning method of claim 1 further comprising the steps of:
   defining a second cursor-position object; and
   positioning alternately said cursor between said cursor-position object and said second cursor-position object responsive to a user-controlled signal while remaining in said position selection mode.

3. The cursor-positioning method of claim 2 wherein said user-controlled signal is initiated by actuation of a key of a keyboard coupled to said computer system.

4. The cursor-positioning method of claim 2 wherein said user-controlled signal is initiated from a cursor positioning signal from a relative-pointing device coupled to said computer system.

5. A cursor positioning system, comprising:
   a computer having a memory, a display and a processor;
   a relative-pointing device, coupled to said computer, for producing cursor positioning signals to position a cursor presented by said display; and
   programming means, coupled to said memory and responsive to said cursor positioning signals, for instructing said processor to:
   create a cursor-position object to said memory by use of a cursor driver coupled to said memory;
   monitor for an activation of a position-selection mode; and
   present said cursor proximate said cursor-position object after activation of said position-selection mode.

6. The cursor positioning system of claim 5 wherein said programming means instructs said processor to create said cursor-position object at a position determined from said cursor positioning signals of said relative-pointing device during a position-definition mode.

7. The cursor positioning system of claim 6 wherein said programming means instructs said processor to record said cursor-position object automatically during operation of said relative-pointing device.

8. The cursor positioning system of claim 5 wherein said programming means further instructs said processor to:
   create a second cursor-position object to said memory; and
   position alternately said cursor between said cursor-position object and said second cursor-position object responsive to a user-controlled signal while remaining in said position-selection mode.

9. A method for controlling a position of a cursor presented on a monitor of a computer system by a cursor driver, the computer system further including a memory, and a relative-pointing device coupled to the computer system for producing cursor positioning signals, comprising the steps of:
   creating a cursor-position object to the memory by use of the cursor driver coupled to the memory;
   monitoring for an activation of a position-selection mode;
   identifying, using cursor positioning signals received during said position-selection mode, said cursor-position object; and
   positioning the cursor at said identified cursor-position object.

10. A method for controlling a position of a cursor presented on a monitor of a computer system, the computer system further including a memory, and a relative-pointing device coupled to the computer system for producing cursor positioning signals, comprising the steps of:
    creating a plurality of cursor-position objects to the memory by use of a cursor driver coupled to the memory;
    monitoring for an activation of a position-selection mode;
    identifying, using the cursor positioning signals received during said position-selection mode, a particular one of said plurality of cursor-position objects; and
    positioning the cursor at said particular one cursor-position object.

11. The cursor position controlling method of claim 10 wherein said identifying step further includes the steps of:
    receiving an x-component and a y-component cursor positioning signal during the position-selection mode;
    comparing a vector sum of said x-component cursor positioning signal and said y-component cursor positioning signal to a predetermined value to determine if said vector sum meets a threshold to produce a thresholded positioning signal;
    extending a logical cone from a position of the cursor in a direction determined by said thresholded positioning signal;
    establishing a set of said plurality of cursor-position objects that are included within said logical cone; and
    selecting a cursor-position object, closest to a present cursor position, from said set of cursor-position objects as said particular one of said plurality of cursor positions.

12. A cursor positioning system for a computer system, comprising:
    a relative-pointing device, coupled to the computer system, for producing cursor positioning signals responsive to a user-initiated manipulation of the said relative-pointing device;
    means, coupled said computer system, for initiating a cursor-position object definition mode;
    means, coupled to said computer system, for initiating a cursor-position object selection mode; and
    a cursor driver, coupled to a memory of the computer system to position a cursor presented on a display of the computer system responsive to said cursor positioning signals and coupled to said relative-pointing device, said cursor driver responsive to cursor positioning signals received during said position object definition mode to create a cursor-position object, at a particular cursor position, to said memory upon detection of a user-initiated signal, and said cursor driver responsive to cursor positioning signals received during said position object selection mode to position said cursor to said particular cursor position by use of said recorded cursor-position object.

13. A method for controlling a position of a cursor presented on a monitor of a computer system further including a memory and a relative-pointing device for producing cursor positioning signals, comprising the steps of:
    recording a cursor bias object to the memory by use of a cursor driver coupled to the memory; and
    biasing the position of the cursor relative said cursor bias object during positioning of the cursor by the relative-pointing device.

14. The cursor position controlling method of claim 13 wherein said cursor position biasing step is an attractive biasing.

15. A method for controlling a position of a cursor presented on a monitor of a computer system further including a memory and a relative-pointing device for producing cursor positioning signals, comprising the steps of:

recording a plurality of cursor bias objects to the memory by use of a cursor driver coupled to the memory; and biasing the position of the cursor toward a net bias effect of said plurality of cursor bias objects during positioning of the cursor by the relative-pointing device.

16. A cursor positioning system for a computer system, comprising:

a relative-pointing device, coupled to the computer system, for producing cursor positioning signals responsive to a user-initiated manipulation of the said relative-pointing device;

means, coupled said computer system, for initiating a cursor bias object definition mode; and a cursor driver, coupled to a memory of the computer system to position a cursor presented on a display of the computer system responsive to said cursor positioning signals and coupled to said relative-pointing device, said cursor driver responsive to cursor positioning signals received during said bias object definition mode to record a cursor bias object, at a particular cursor position, to said memory upon detection of a user-initiated signal, and said cursor driver responsive to subsequent cursor positioning signals to bias said cursor towards said particular cursor position.

17. A cursor positioning system for a computer system, comprising:

a relative-pointing device, coupled to the computer system, for producing cursor positioning signals responsive to a user-initiated manipulation of the said relative-pointing device; and a cursor driver, coupled to a memory of the computer system to position a cursor presented on a display of the computer system responsive to said cursor positioning signals and coupled to said relative-pointing device, said cursor driver including means, responsive to cursor positioning signals received during positioning of said cursor, to dynamically record cursor-position objects, at a plurality of particular cursor positions, to said memory upon detection of a prespecified user-initiated signals, and said cursor driver responsive to cursor positioning signals received during a position object selection mode implemented responsive to a user-initiated signal, to position said cursor to one of said particular cursor positions by use of a selected one of said recorded cursor-position objects.

18. A cursor-positioning method, comprising the steps of:

recording a cursor-position object for a cursor displayed on a monitor of a computer system by use of a cursor driver coupled to a processor of said computer system;

positioning a cursor displayed on said monitor from a particular location to proximate said cursor-position object after activation of a position-selection mode; and defining automatically, by use of said cursor driver, a second cursor-position object at said particular location.

19. The cursor positioning method of claim 18 further comprising the step of:

returning said cursor to said second cursor-position object wherein said cursor is returned to said particular location.

20. A cursor-positioning method, comprising the steps of:

defining dynamically a cursor-position object for a cursor displayed on a monitor of a computer system through use of a cursor driver coupled to a processor of said computer system, responsive to signals from a relative-pointing device coupled to said computer system; and positioning a cursor proximate to said cursor position object after activation of a position selection mode.

21. A cursor-positioning method, comprising the steps of:

defining dynamically a cursor-bias object for a cursor displayed on a monitor of a computer system through use of a cursor driver coupled to a processor of said computer system, wherein said defining step is responsive to signals from a relative-pointing device coupled to said computer system; and biasing a cursor relative to said cursor bias object during movement of said cursor responsive to signals from said relative pointing device.

22. The cursor positioning method of claim 21 wherein said biasing step attracts said cursor towards said cursor bias object.

23. A computer-implemented method for biasing a position of a cursor presented on a display of a computer system, wherein the computer system includes a processor and a relative pointing device, the method comprising the steps of:

creating a biasing target at a first location of the display;

issuing a plurality of cursor positioning signals from the relative pointing device that would position the cursor to a second location on the display wherein said second location is different from said first location; and modifying said cursor positioning signals from the relative pointing device as they are issued, so the cursor position is shifted away from said second location in response to said biasing target.

24. The computer-implemented biasing method of claim 23 wherein said modifying step places the cursor position between said first location and said second location.

25. The computer-implemented biasing method of claim 24 wherein said biasing target is dynamically defined during an operating mode of the computer system by cursor positioning signals received from the relative pointing device wherein said biasing target is created at said first location when the cursor is positioned at the first location and a selection signal from the relative pointing device is activated.

26. The computer-implemented biasing method of claim 24 wherein said biasing target has an associated weighting factor and wherein in said modifying step, the cursor position is shifted towards said first location by an amount dependent upon said associated weighting factor.

27. The computer-implemented biasing method of claim 23 wherein said creating step creates a second biasing target at a third location different from said first and said second locations and wherein said modifying step shifts the cursor position between said second location and said first and third locations.

28. The computer-implemented biasing method of claim 27 wherein said first biasing target has an associated first weighting factor and said second biasing target has an associated second weighting factor different from said first weighting factor and wherein in said modifying step, the cursor position is shifted towards said first and said third particular locations by an amount dependent upon said first and said second associated weighting factors, respectively.

29. A computer-implemented method for biasing a position of a cursor presented on a display of a computer system, wherein the computer system includes a processor and a relative pointing device, the method comprising the steps of:

creating a biasing object at a first location of the display;

issuing a plurality of cursor positioning signals from the relative pointing device that would position the cursor to a second location on the display wherein said second particular location is different from said first location; and modifying said cursor positioning signals from the relative pointing device while the relative pointing device is operated, wherein the cursor position is shifted away from said second location in response to said biasing object.

30. A method for positioning a cursor presented at a first location on a display of a computer system, wherein the computer system includes a processor and a relative-pointing device, the method comprising the steps of:

translating, using a cursor driver stored in a memory coupled to the processor and to the relative-pointing device, a cursor positioning signal received from the relative-pointing device into a cursor locate signal; and thereafter displaying the cursor at a second location on the display identified by said cursor locate signal, wherein said translating step further comprises the steps of:

determining whether a user of the computer system has activated a jump mode of the cursor driver; thereafter selecting, when said jump mode is activated, a cursor target location from a plurality of cursor target locations stored in said memory by said cursor driver, said cursor driver creating a target region from said cursor positioning signal received while said jump mode is activated said cursor driver identifying a set of cursor target locations within said target region, and said cursor driver choosing one of said set of cursor target locations within said target region as said cursor target location; and thereafter generating said cursor locate signal from said cursor target location when said jump mode is activated.

31. A method for biasing a cursor presented at a first location on a display of a computer system, wherein the computer system includes a processor and a relative-pointing device, the method comprising the steps of:

translating, using a cursor driver stored in a memory coupled to the processor and to the relative-pointing device, a cursor positioning signal received from the relative-pointing device into a cursor locate signal; and thereafter displaying the cursor on the display identified by said cursor locate signal, wherein said translating step further comprises the step of:

altering, using said cursor driver, said cursor locate signal from locating the cursor at a second location identified by said cursor positioning signal to a third location, said cursor driver determining said third location responsive to a proximity of said second location to a biasing target and responsive to a weighting factor of said biasing target.

32. The biasing method of claim 31 wherein said third location is between said second location and said bias target.

33. The computer-implemented method of claim 29 wherein said modifying step includes the step of shifting the cursor position away from said first location.

* * * * *